Figure 1:
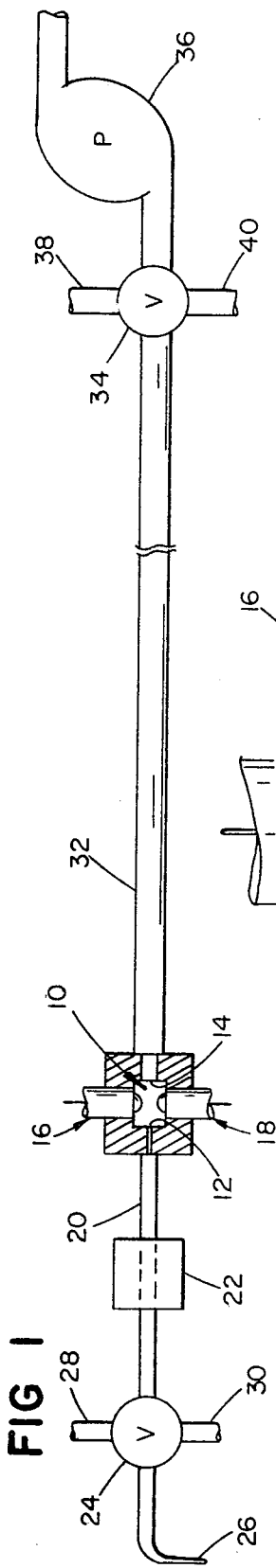

United States Patent
Neuwelt

[15] 3,661,010
[45] May 9, 1972

[54] FLUID SAMPLE ANALYZING APPARATUS

[72] Inventor: Robert T. Neuwelt, Arlington, Mass.
[73] Assignee: Instrumentation Laboratory, Inc., Lexington, Mass.
[22] Filed: Apr. 7, 1970
[21] Appl. No.: 27,193

[52] U.S. Cl. .................................73/61 R, 73/19, 128/2 E
[51] Int. Cl. .........................................................G01n 7/10
[58] Field of Search..................73/53, 61, 19, 23; 128/2 E, 128/2.1 E, 2.05 D

[56] References Cited

UNITED STATES PATENTS 3,507,146   4/1970   Webb.....................................73/23 X
3,518,982   7/1970   Timmins et al. ......................73/23 X

OTHER PUBLICATIONS

Sproule, B. J. et al. An Improved Polarographic Method for Measuring Oxygen Tension in Whole Blood. In Jour. of Applied Physiology. 11(3) p. 365–370. Nov. 1957.

*Primary Examiner*—Louis R. Prince
*Assistant Examiner*—Joseph W. Roskos
*Attorney*—Willis M. Ertman

[57] ABSTRACT

In a method of analyzing a fluid sample employing an electrochemical sensor that has a selectively permeable membrane disposed in the sample chamber, sample fluid to be analyzed is introduced into the sample chamber at a first flow rate, and flow of the sample fluid across the membrane in the sample chamber is continued at a reduced rate for a length of time greater than that required to fill the sample chamber at the first flow rate.

5 Claims, 2 Drawing Figures

PATENTED MAY 9 1972 3,661,010

FLUID SAMPLE ANALYZING APPARATUS

SUMMARY OF INVENTION

This invention relates to analysis apparatus and more particularly to methods and apparatus for the analysis of fluid samples.

In the analysis of parameters of precious fluids such as blood, electrochemical sensors that employ selectively permeable membranes are frequently of particular use. With such electrochemical sensors, the accuracy of measurement is affected by the equilibration of the membrane. In conjunction with electrodes of the type in which a gas is consumed during the measurement, the membrane must be saturated and the sample contaminants must be removed from the surface of the membrane in the equilibration process. Also, it is frequently desired to use a small sample, for example in the analysis of precious fluids such as blood and the quantity of the sample required for equilibration and analysis should be minimized without producing degradation of the sample.

Accordingly it is an object of this invention is provide novel and improved instrumentation systems which facilitate accurate analysis of fluid samples.

Another object of the invention is to provide a novel and improved system which provides accurate analyses of constituents of precious fluids such as blood.

Still another object of the invention is to provide a novel and improved analysis system that employs electrochemical sensors of the type that utilize selectively permeable membranes.

A further object of the invention is to provide novel and improved arrangements which provide efficient and accurate fluid analyses and minimize the degradation as a function of time of the sample being analyzed.

In accordance with the invention, in analysis apparatus employing a sensor having a selectively permeable membrane, equilibration is accelerated by continuing flow of a fluid sample across the membrane after the sample has been introduced into the sample chamber at a reduced rate for a length of time greater than that required to fill the sample chamber at the flow rate at which the sample is introduced into said sample chamber. In analyses of samples of precious fluids, it is preferred to employ an exponentially decreasing flow rate.

In preferred embodiments there is provided fluid sample analyzing apparatus that includes a sample chamber having an inlet and an outlet. A constituent sensor, in communication with the sample chamber, includes a selectively permeable membrane across which a constituent of interest can diffuse. Means are coupled to the chamber for introducing a sample fluid to the chamber and continuing the flow of sample fluid across the membrane at a rate less than the flow rate at which the sample was introduced to the chamber for a length of time greater than the time required to fill the chamber at the sample introduction flow rate. This reduced flow rate or "afterdraw" may be accomplished in a variety of ways, for example by varying the pumping rate or adjusting a valve. In a particular embodiment, a small diameter, relatively rigid resistor conduit is connected to the chamber inlet and a capacitor conduit of larger diameter and greater flexibility than the resistor conduit is coupled to the chamber outlet. A peristaltic suction pump is connected to the capacitor conduit and a control valve is interposed between the pump and the capacitor conduit. In operation, liquid is drawn into the sample chamber by the suction pump for a short period of time and the control valve is then closed. As the suction pump has reduced the pressure in the capacitor conduit, movement of the sample continues at an exponentially decreasing rate after the valve is closed. This continuing motion promotes the rapid equilibration of the constituent sensor, while requiring use of only a small volume of sample.

In a particular embodiment, two electrochemical sensors are in communication with a sample chamber that has a volume of about one-tenth milliliter. Each sensor includes an electrode assembly that is responsive to a particular gas in the sample and a selectively permeable membrane across which the gas of interest can diffuse for sensing by the electrode assembly. The inlet resistor conduit is stainless steel and has an inner diameter of 0.023 inch and the outlet capacitor conduit is resilient organic polymeric material and has an inner diameter of one-sixteenth inch. In that system, the control valve is opened for only 8 seconds to induct about 0.4 milliliters of sample into the sample chamber but sample movement past the sensors occurs for about 18 seconds, and the sensors are rapidly equilibrated and provide accurate data readout. An exponentially decreasing flow rate is particularly advantageous with the analysis of samples of precious fluids. The invention is particularly useful in connection with electrochemical sensors for the measurements of partial pressures of oxygen and carbon dioxide and other electrochemical sensors of the type in which a constituent of interest is consumed during measurement. The invention provides more rapid equilibration of such sensors and more accurate measurements.

Figure 2:
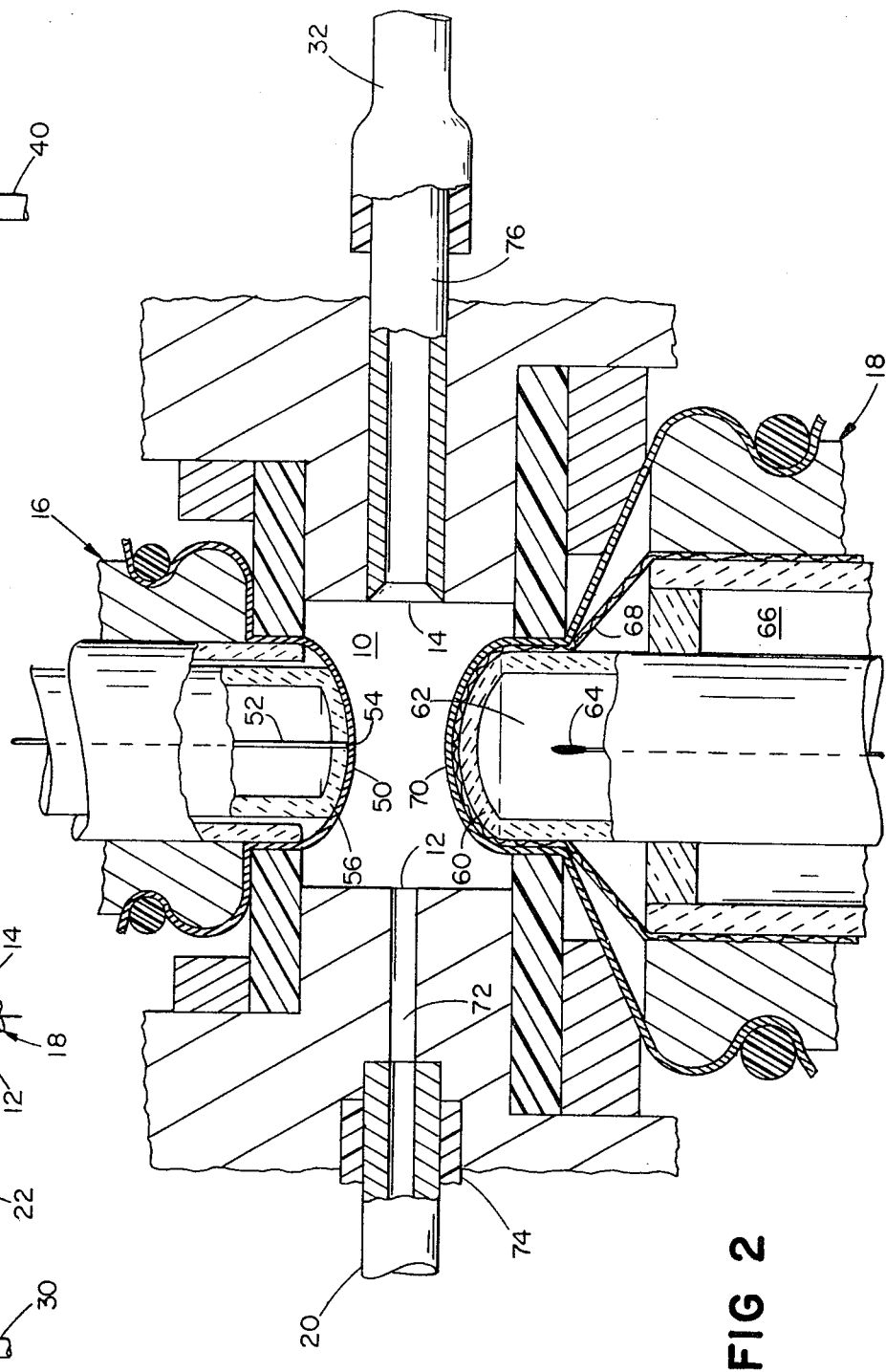

Other objects, features and advantages of the invention will be seen as the following description of a particular embodiment progresses, in conjunction with the drawings in which:

FIG. 1 is a diagrammatic view of a blood gas analysis system constructed in accordance with the invention; and FIG. 2 is a sectional view of the sample chamber and sensing electrodes employed in the system shown in FIG. 1.

DESCRIPTION OF PARTICULAR EMBODIMENT

With reference to FIG. 1, the instrument includes a sample chamber 10 having an inlet port 12 and an outlet port 14. A $Po_2$ electrode assembly 16 and a $Pco_2$ electrode assembly 18 disposed for sensing a fluid sample in chamber 12.

Connected to the inlet 12 is a stainless steel capillary inlet line 20, 0.023 inch in inner diameter that passes through a heater assembly 22. Inlet valve 24 connects a sampling tip 26 to inlet line 20 in one position. In a second position of the inlet valve 24 inlet line 20 is connected to a source of calibrating gas via line 28 and in a third position the inlet line is connected to a source of cleaning fluid via line 30.

Connected to the outlet port 14 of sample chamber 10 is a 16 inch length of flexible polyvinylchloride tubing 32 that has an inner diameter of one-sixteenth inch and a wall thickness of one thirty-second inch. Connected to the other end of conduit 32 is a four way valve 34 that has a first position connecting conduit 32 to low speed peristaltic pump 36, a second position that connects conduit 32 to a high speed peristaltic pump overline 38, a third position that connects conduit 32 to the atmosphere via line 40, and an inhibit position that blocks the end of conduit 32.

Additional details of the sampling chamber 10 and the electrochemical sensors 16, 18 are shown in FIG. 2. Chamber 10 is cylindrical and has a volume of less than 0.1 milliliter. In the preferred embodiment inlet port 12 is at right angles to outlet port 14 but has been shown rotated 90° in FIG. 2 for clarity of illustration. The $Po_2$ electrode 16 employs polypropylene membrane 50 which is permeable to oxygen but not to contaminants and reducible ions of the sample and produces a current at a constant polarizing voltage which is directly proportional to the tension of oxygen diffusing through membrane 50 to the reactive surface of cathode 52, the tip 54 of which is exposed at the outside surface of glass envelope 56. The $Pco_2$ electrode 18 includes a pH sensitive glass membrane 60 which forms an end wall of inner chamber 62 in which is housed a silver/silver chloride electrode 64. An outer chamber 66 is filled with a $Pco_2$ electrolyte that contains a silver/silver chloride reference electrode (not shown). Disposed over the end of the electrode assembly is a nylon mesh spacer 68 and a plastic membrane 70 that is permeable to carbon dioxide gas but not to ions. Inlet port 12 is at the end of passage 72 and resistor conduit 20 is aligned with passage 72 and sealed with seal ring 74. Outlet port 14 is at one end of stainless steel tube 76 and capacitor conduit 32 is secured over the other end of tube 76.

As shown in FIG. 2, the membrane covered tip of each electrode extends into chamber 10 for direct exposure to the sample that is supplied to that chamber through inlet 12 and removed from that chamber through outlet 14. Further details of the analysis system may be had with reference to copending application filed concurrently in the names of Spergel et al., entitled "Fluid Analyzing Apparatus" and assigned to the same assignee as this application.

In operation, flush solution is pumped by a high capacity pump (200 microliters/sec.) through chamber 10 from line 30 via valves 26 and 34 to line 38. The instrument is then calibrated with two analyzed gases supplied through line 28 and valve 26. With valve 34 connecting outlet line 32 to atmosphere via line 40. When the response of the electrodes have been calibrated satisfactorily, the instrument is ready for sampling. With the sample tip 24 immersed in a blood sample to be analyzed, a sample button is depressed and control circuits operate valve 26 to connect sample tip 24 to inlet line 20 and valve 34 to connect outlet line 32 to pump 36 which produces a flow rate of about 25 microliters per second. After valve 34 is closed, the sample continues to be drawn into the sample chamber 10 and across the surfaces of the membranes 50 and 70. The pump 36 has reduced the pressure in volume capacitor 32 and as the sample tip is at atmospheric pressure and inlet line 20 is a rigid flow resistor, the liquid sample continues to move under the influence of the volume capacitor tube 32 at a velocity $V$ which is characterized: $V=e^{-xt}$, where $x$ is a constant and is a function of characteristics of the volume capacitor tube 32, the flow resistor tube 20, the geometry of sample chamber 10, the viscosity of the sample fluid, and the capacity of the pump. In this embodiment, valve 34 is open for only 8 seconds but the movement of the sample past membranes 50 and 72 occurs for 18 seconds, while requiring a sample volume of only 0.4 cubic centimeters.

This apparatus enables efficient equilibration of the electrode assemblies and rapid, accurate analyses of fluid samples. Additional details of a blood analysis system in which this apparatus is incorporated are set out in copending patent application Ser. No. 27200, entitled "Fluid Analyzing Apparatus" filed in the names of Spergel et al. and assigned to the same assignee as this application.

While a particular embodiment of the invention has been shown and described, various modifications thereof will be apparent to those skilled in the art and it is not intended that the invention be limited to the disclosed embodiment or to details thereof, and departures may be made therefrom within the spirit and scope of the invention as defined in the claims.

What is claimed is:

1. Fluid sample analyzing apparatus comprising a sample chamber having an inlet and an outlet, a constituent sensor in communication with said sample chamber, said constituent sensor including a sensing surface and a selectively permeable membrane disposed between said sensing surface and the fluid sample in said chamber, means to introduce a fluid sample into said chamber for analysis at a first flow rate, and means to continue flow of the sample fluid across said membrane at an exponentially decreasing rate for a length of time greater than that required to fill said sample chamber at said first flow rate.

2. Fluid sample analyzing apparatus comprising a sample chamber having an inlet and an outlet, a constituent sensor in communication with said sample chamber, a small diameter, relatively rigid, fluid resistor conduit coupled to said chamber inlet, a fluid capacitor conduit of larger diameter and greater flexibility than said resistor conduit connected to said chamber outlet, a suction pump connected to the outlet of said capacitor conduit, and a control valve interposed between said pump and said capacitor conduit for controlling the flow of fluid through said resistor conduit, said sample chamber, and said capacitor conduit, said capacitor conduit having sufficient flexibility to produce continued movement of fluid sample through said chamber after said valve is closed.

3. The apparatus as claimed in claim 2 wherein said constituent sensor includes a sensing surface and a selectively permeable membrane disposed between said sensing surface and the fluid sample in said chamber.

4. The apparatus as claimed in claim 2 wherein said sample chamber has a volume of less than 1 milliliter, two constituent sensors are disposed in communication with said sample chamber, each said constituent sensor including a sensing surface and a selectively permeable membrane disposed between said sensing surface and the fluid sample in said chamber.

5. The apparatus as claimed in claim 4 wherein one said constituent sensor is a $P_{O_2}$ electrode assembly and the other constituent sensor is a $P_{CO_2}$ electrode assembly.

* * * * *